(12) United States Patent
Milton et al.

(10) Patent No.: US 12,253,249 B2
(45) Date of Patent: Mar. 18, 2025

(54) DEVICE AND METHOD FOR GROWING CROPS WITH NON-FIBROUS AND NON-CONSUMABLE MEDIA

(71) Applicants: Schuyler David Milton, Vienna, VA (US); Keith Thomas Born, Bowie, MD (US)

(72) Inventors: Schuyler David Milton, Vienna, VA (US); Keith Thomas Born, Bowie, MD (US)

( * ) Notice: Subject to any disclaimer, the term of this patent is extended or adjusted under 35 U.S.C. 154(b) by 0 days.

(21) Appl. No.: 16/943,138

(22) Filed: Jul. 30, 2020

(65) Prior Publication Data

US 2021/0029902 A1     Feb. 4, 2021

Related U.S. Application Data

(60) Provisional application No. 62/881,800, filed on Aug. 1, 2019.

(51) Int. Cl.

| | | |
|---|---|---|
| *A01G 9/24* | (2006.01) | |
| *A01G 7/04* | (2006.01) | |
| *A01G 31/02* | (2006.01) | |
| *F21S 4/28* | (2016.01) | |
| *F21V 29/67* | (2015.01) | |
| *F21V 33/00* | (2006.01) | |
| *H05B 45/10* | (2020.01) | |
| *H05B 47/16* | (2020.01) | |
| *F21W 131/109* | (2006.01) | |
| *F21Y 115/10* | (2016.01) | |

(52) U.S. Cl.
CPC ............. *F21V 29/67* (2015.01); *A01G 7/045* (2013.01); *A01G 9/247* (2013.01); *A01G 31/02* (2013.01); *F21S 4/28* (2016.01); *F21V 33/0096* (2013.01); *H05B 45/10* (2020.01); *H05B 47/16* (2020.01); *F21W 2131/109* (2013.01); *F21Y 2115/10* (2016.08)

(58) Field of Classification Search
CPC ........ A01G 31/00; A01G 24/00; A01G 9/025; A01G 24/18; A01G 20/20; A01G 24/44; A01G 31/02; A01G 9/0293; A01G 2031/006; A01G 24/46; A01C 1/044; E01C 9/004; E04D 11/002; Y10T 428/23957
USPC .......................................... 47/56, 32.7, 59 S
See application file for complete search history.

(56) References Cited

U.S. PATENT DOCUMENTS

| | | |
|---|---|---|
| 2,244,677 A | 6/1941 | Cornell |
| 3,708,009 A | 1/1973 | Viol et al. |
| 3,874,721 A | 4/1975 | Tuggle |
| 4,035,950 A | 7/1977 | Anselm |
| 4,047,327 A | 9/1977 | Tesch |
| 4,244,145 A | 1/1981 | Polacsek |

(Continued)

*Primary Examiner* — Jeffrey R Larsen

(57) ABSTRACT

A device and method for growing plants from seed, seedling, clone, root stock or young plant without the use of synthetic or natural fibers or fibrous media. The device comprises flexible non-fibrous structures that support the seed, plant or root stock during growth, while also establishing a delineation between the root zone and shoot zone of the plant. The structure of the device allows water supplied to either the root zone side or the shoot zone side of the device to wick around the seeds and roots and is constructed with spacing and angles such that water applied to either side is directed only to drain toward the root zone side of the device.

14 Claims, 17 Drawing Sheets
(15 of 17 Drawing Sheet(s) Filed in Color)

(56) References Cited

U.S. PATENT DOCUMENTS

| | | |
|---|---|---|
| 4,295,296 A | 10/1981 | Kinghorn |
| 4,309,844 A | 1/1982 | King et al. |
| 4,332,105 A | 6/1982 | Nir |
| 4,382,348 A * | 5/1983 | Kitsu .................... A01G 31/02 47/59 R |
| 4,505,068 A | 3/1985 | Kaneko |
| 4,569,150 A | 2/1986 | Carlson et al. |
| 4,584,791 A | 4/1986 | Wolf |
| 4,658,878 A | 4/1987 | Williams |
| 4,713,909 A | 12/1987 | Roper et al. |
| 4,813,176 A | 3/1989 | Takayasu |
| 4,844,109 A | 7/1989 | Navarro |
| 4,869,019 A | 9/1989 | Ehrlich |
| 4,924,623 A | 5/1990 | van Rens |
| 4,965,962 A | 10/1990 | Akagi |
| 4,982,526 A | 1/1991 | Miyachi |
| 5,077,935 A | 1/1992 | Stoever et al. |
| 5,173,079 A | 12/1992 | Gerrish |
| 5,226,255 A | 7/1993 | Robertson |
| 5,317,834 A | 6/1994 | Anderson |
| 5,363,594 A | 11/1994 | Davis |
| 5,417,010 A | 5/1995 | Ecer |
| 5,533,302 A | 7/1996 | Lynch et al. |
| 5,560,415 A | 10/1996 | Geissler |
| 5,617,673 A | 4/1997 | Takashima |
| 5,724,768 A | 3/1998 | Ammann, Jr. |
| 5,862,628 A | 1/1999 | Takashima |
| 5,918,416 A | 7/1999 | Ammann, Jr. |
| 5,937,575 A | 8/1999 | Zobei et al. |
| 6,006,471 A | 12/1999 | Sun |
| 6,061,957 A | 5/2000 | Takashima |
| 6,070,358 A | 6/2000 | Meikle et al. |
| 6,082,044 A | 7/2000 | Sherfield |
| 6,105,309 A | 8/2000 | Takayanagi |
| 6,219,965 B1 | 4/2001 | Ishikawa et al. |
| 6,237,282 B1 | 5/2001 | Pitts |
| 6,360,482 B1 | 3/2002 | Boyes |
| 6,360,483 B1 | 3/2002 | Sherfield |
| 6,446,386 B1 | 9/2002 | Holloway |
| 6,508,033 B2 | 1/2003 | Hessel et al. |
| 6,578,319 B1 | 6/2003 | Cole et al. |
| 6,615,542 B2 | 9/2003 | Ware |
| 6,691,135 B2 | 2/2004 | Pickett et al. |
| 6,840,008 B1 | 1/2005 | Bullock et al. |
| 7,055,282 B2 | 6/2006 | Bryan, III et al. |
| 7,080,482 B1 | 7/2006 | Bradley |
| 7,406,854 B2 | 8/2008 | Lange et al. |
| 8,181,391 B1 * | 5/2012 | Giacomantonio ..... A01G 9/025 47/62 R |
| 8,533,992 B2 | 9/2013 | Harwood |
| 8,533,993 B2 | 9/2013 | Pettibone |
| 8,782,948 B2 | 7/2014 | Harwood et al. |
| 9,226,457 B2 | 1/2016 | Laurence |
| D758,917 S | 6/2016 | Smith |
| 9,468,156 B2 | 10/2016 | Sichello |
| 9,591,814 B2 | 3/2017 | Collins |
| 10,306,847 B2 | 6/2019 | Whitcher et al. |
| 10,517,241 B1 * | 12/2019 | Goldsmith ............... A01G 7/00 |
| 10,631,481 B2 | 4/2020 | Storey |
| 2003/0121362 A1 | 7/2003 | Goellner |
| 2003/0188477 A1 | 10/2003 | Pasternak et al. |
| 2006/0162252 A1 | 7/2006 | Lim |
| 2009/0255179 A1 | 10/2009 | Falknor |
| 2010/0042234 A1 | 2/2010 | May et al. |
| 2010/0146855 A1 | 6/2010 | Ma |
| 2012/0047801 A1 | 3/2012 | Hogan |
| 2012/0090235 A1 * | 4/2012 | Horn ...................... A01G 24/00 47/59 R |
| 2012/0137578 A1 | 6/2012 | Bradford |
| 2012/0311926 A1 | 12/2012 | Mittelmark |
| 2013/0118074 A1 | 5/2013 | Fu Lb Rook |
| 2013/0152468 A1 | 6/2013 | Huang et al. |
| 2013/0326950 A1 | 12/2013 | Nilles |
| 2014/0000163 A1 | 1/2014 | Lin |
| 2014/0115958 A1 | 5/2014 | Helene et al. |
| 2014/0200690 A1 | 7/2014 | Kumar |
| 2014/0223816 A1 | 8/2014 | Parker |
| 2015/0000190 A1 | 1/2015 | Gibbons |
| 2015/0196002 A1 * | 7/2015 | Friesth ................... A01G 31/02 47/62 R |
| 2015/0237811 A1 | 8/2015 | Marquez |
| 2015/0313104 A1 | 11/2015 | Cottrell |
| 2016/0227720 A1 * | 8/2016 | Villalon ................... A01G 9/02 |
| 2018/0014471 A1 | 1/2018 | Jensen et al. |
| 2018/0206414 A1 | 7/2018 | Goodman |
| 2018/0317408 A1 * | 11/2018 | Castaldini ............... A01G 31/02 |
| 2020/0008378 A1 * | 1/2020 | Van Buuren ......... A01G 27/005 |
| 2021/0204499 A1 * | 7/2021 | Fujisawa ................ A01G 31/06 |

* cited by examiner

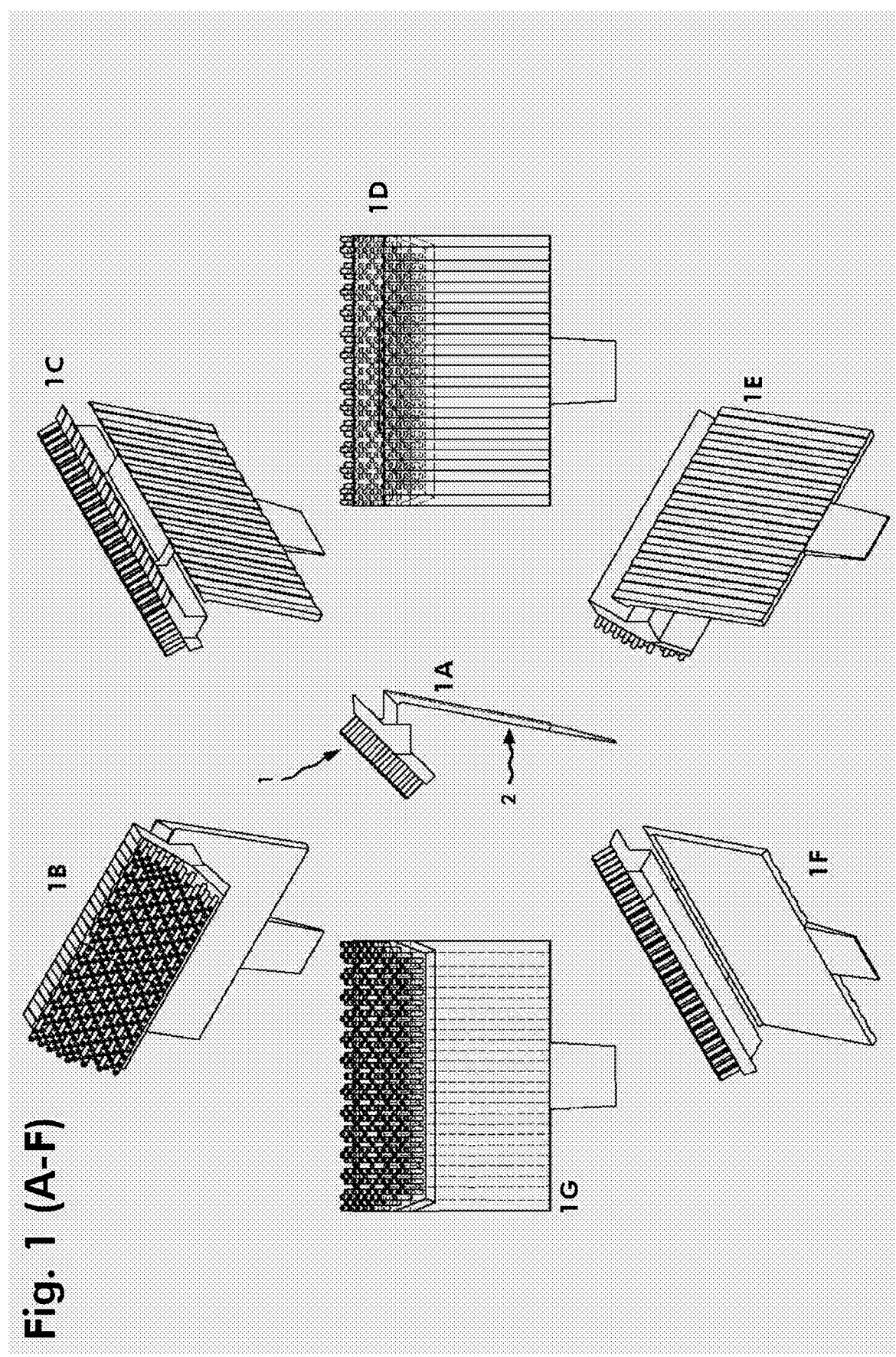
Fig. 1 (A-F)

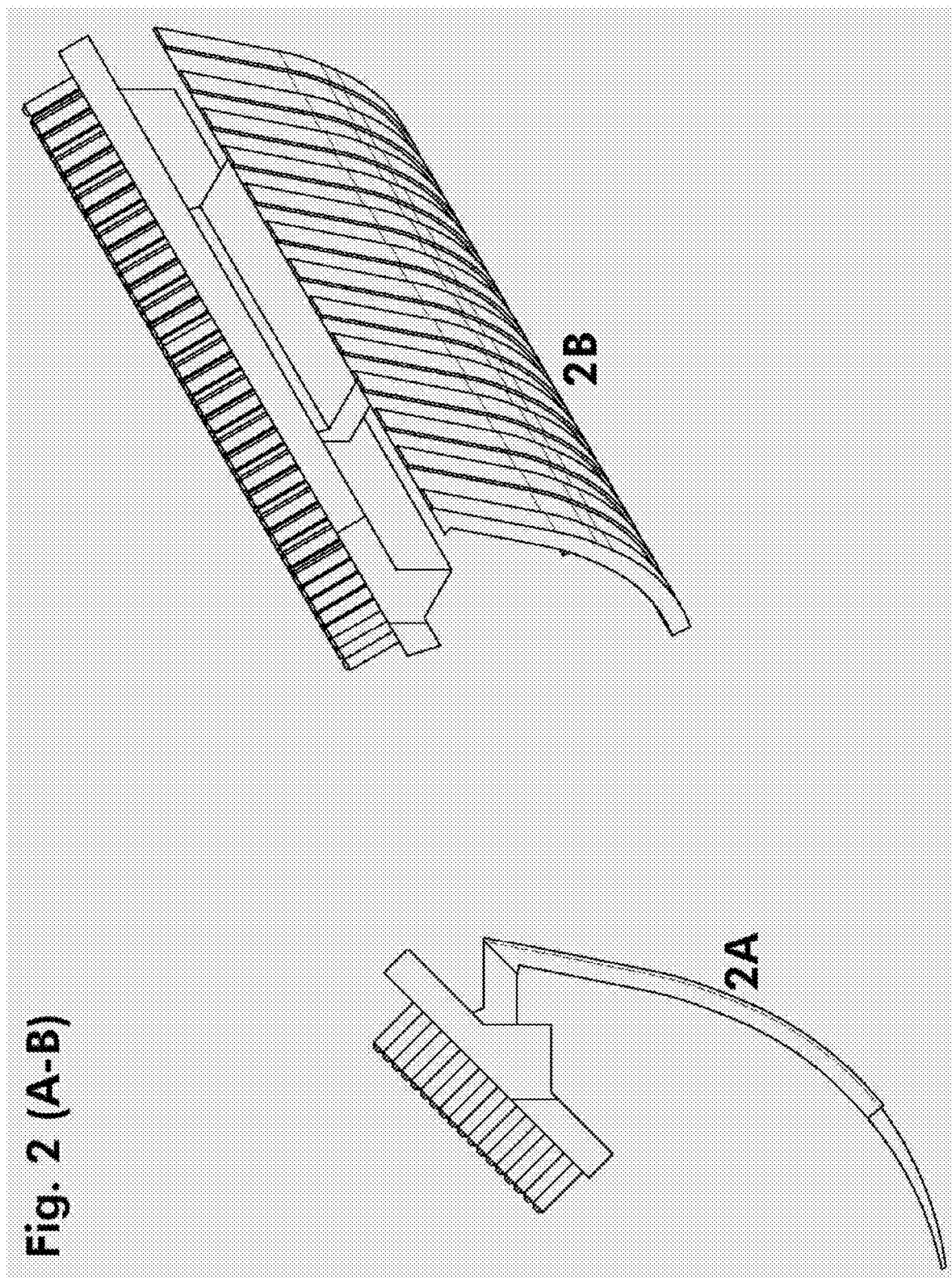
Fig. 2 (A-B)

Fig. 3 (A-B)
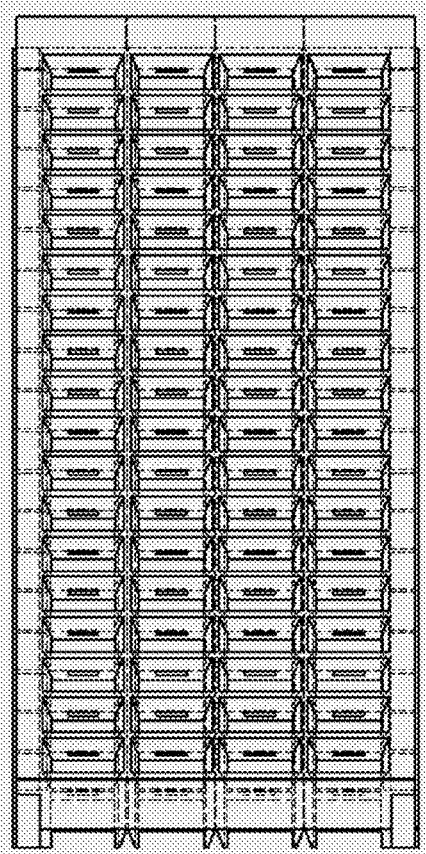
3A
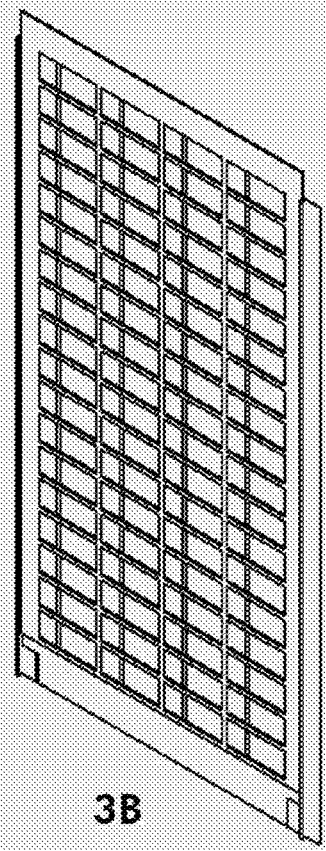
3B

Fig. 4 (A-B)
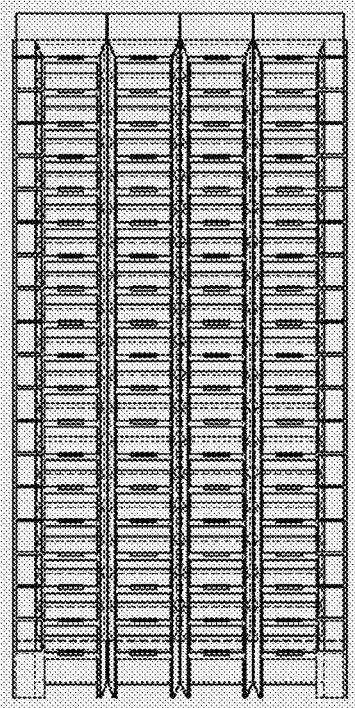
4A
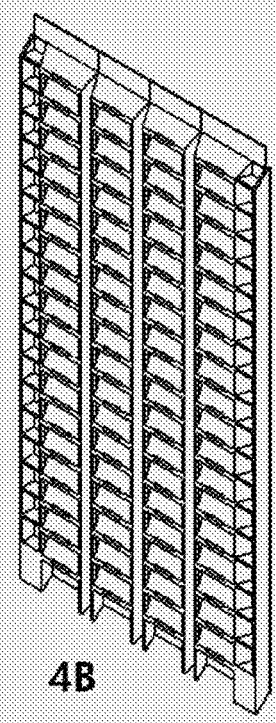
4B

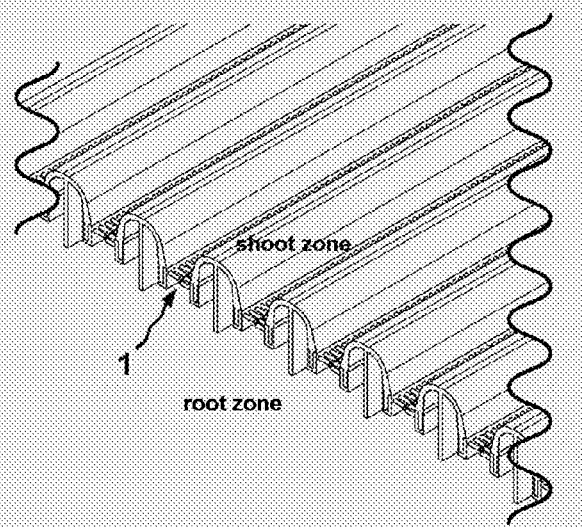
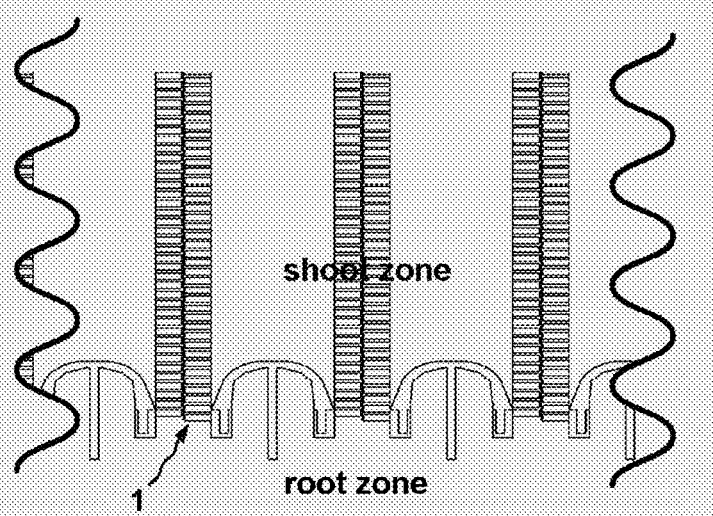
Fig. 17 (A-B)

DEVICE AND METHOD FOR GROWING CROPS WITH NON-FIBROUS AND NON-CONSUMABLE MEDIA

The present invention relates to novel devices, apparatus and methods for growing crops from seed, seedling, clone, plant or root stock without the use of fibrous media using reusable materials. Specifically, the invention relates to a device which enables growing from seed, clone or root stock using synthetic polymeric non-woven materials which are not consumed in the growing process and which are cleaned and reused. The device is applicable to a series of apparatus to grow crops in a variety of orientations such as horizontal, vertical and angled in hydroponic or aeroponic systems. The method relates to the use of the device and apparatus in planting, harvesting and cleaning to prepare for reuse.

BACKGROUND OF THE INVENTION

Hydroponics encompasses the field of growing crops using nutrient rich water. Hydroponics includes various subsets, specifically, aeroponics, deep water culture (DWC), nutrient film technique (NFT) and flood-drain systems.

Hydroponics relies on the delivery of nutrient rich and oxygen rich water to plant roots. Seeds are typically germinated in a fibrous media such as soil, soil composites with synthetic additives, or in woven or non-woven natural or synthetic fibers such as rockwool, peat, coconut coir, hemp, jute or polyester. The germinated seeds are then inserted or otherwise replanted into the hydroponic system once the seeds have germinated and the roots have infiltrated the fibrous media. The fibrous media serves as structural support for the germinating seeds, further providing structural support as the seedling grows. Importantly, the fibrous media serves a primary duty of wicking and retaining water to ensure proper germination.

All hydroponics which grow plants from seed to date employ a fibrous media. Limitations of fibrous media are as follows: (1) Fibrous media may be consumed and therefore represent an ongoing economic cost to the process. For example, soils, natural fibers and non-woven fibers such as rockwool are not cleanable or reusable without substantial reprocessing prior to reuse. (2) Synthetic woven fibers such as polyester require extensive cleaning to remove plant matter interwoven in the fibers from the prior growing cycle. (3) Synthetic fibers such as rockwool and polyester cannot be certified as organic under USDA organic regulations or by parallel regulations in Canada, the European Union or Asia.

SUMMARY OF THE INVENTION

The present invention relates to novel devices, apparatus and methods for growing crops from seed, seedling, clone, plant or root stock (herein "plants"). The device suspends seeds or plants in air such that the shoot system of the seed (once germinated), the plant, plant clone or the root stock is delineated from the root system. The device can be incorporated into a variety of apparatus for use in a horizontal plane, vertical plane, slanted plane, or multifaceted or circular column. The method comprises the steps to operate the apparatus including the steps by which seeds, plant clones or root stock are planted, grown and harvested, and steps by which the apparatus is cleaned and prepared for reuse. The apparatus encompassing the device can be operated in tandem with a lighting and HVAC apparatus. The invention further encompasses an array of tubes on which LED lights are affixed and through which fresh air is circulated. The apparatus may be inserted or removed from the lighting and HVAC array as needed for growing and processing.

BRIEF DESCRIPTION OF THE DRAWINGS

The patent or application file contains at least one drawing and/or photograph executed in color. Copies of this patent or patent application publication with color drawing(s) will be provided by the Office upon request and payment of the necessary fee.

FIG. 1 (A-F) shows the silicone device from the side (1A), back (1G), front (1D), two top angled views (1B and 1C) and two bottom angled views (1F and 1E).

FIG. 2 (A-B) show the silicone device from the side (2A) and front angle (2B) highlighting the flexibility of the device.

FIG. 3 (A-B) shows a semi-rigid structure into which the silicone device is inserted for use. FIG. 3A shows the front. FIG. 3B shows a front angle. Each silicone device is inserted into one of the cells of the structure to form a semi-continuous surface for growing crops.

FIG. 4 (A-B) shows the semi-rigid structure of FIG. 3 from the back (4A) and back angle (4B).

FIG. 17 (A-B) shows two cut-away views with the device used in a horizontal array. A cutaway as viewed from a diagonal is shown (17A) and a cutaway as viewed from an end is shown (17B). Both 17A and 17B are of same object as viewed from different angles to show perspective of the delineation formed between the root zone and shoot zone and the role of the protrusions 1 in creating the delineation.

DETAILED DESCRIPTION OF THE INVENTION

Figure 5:
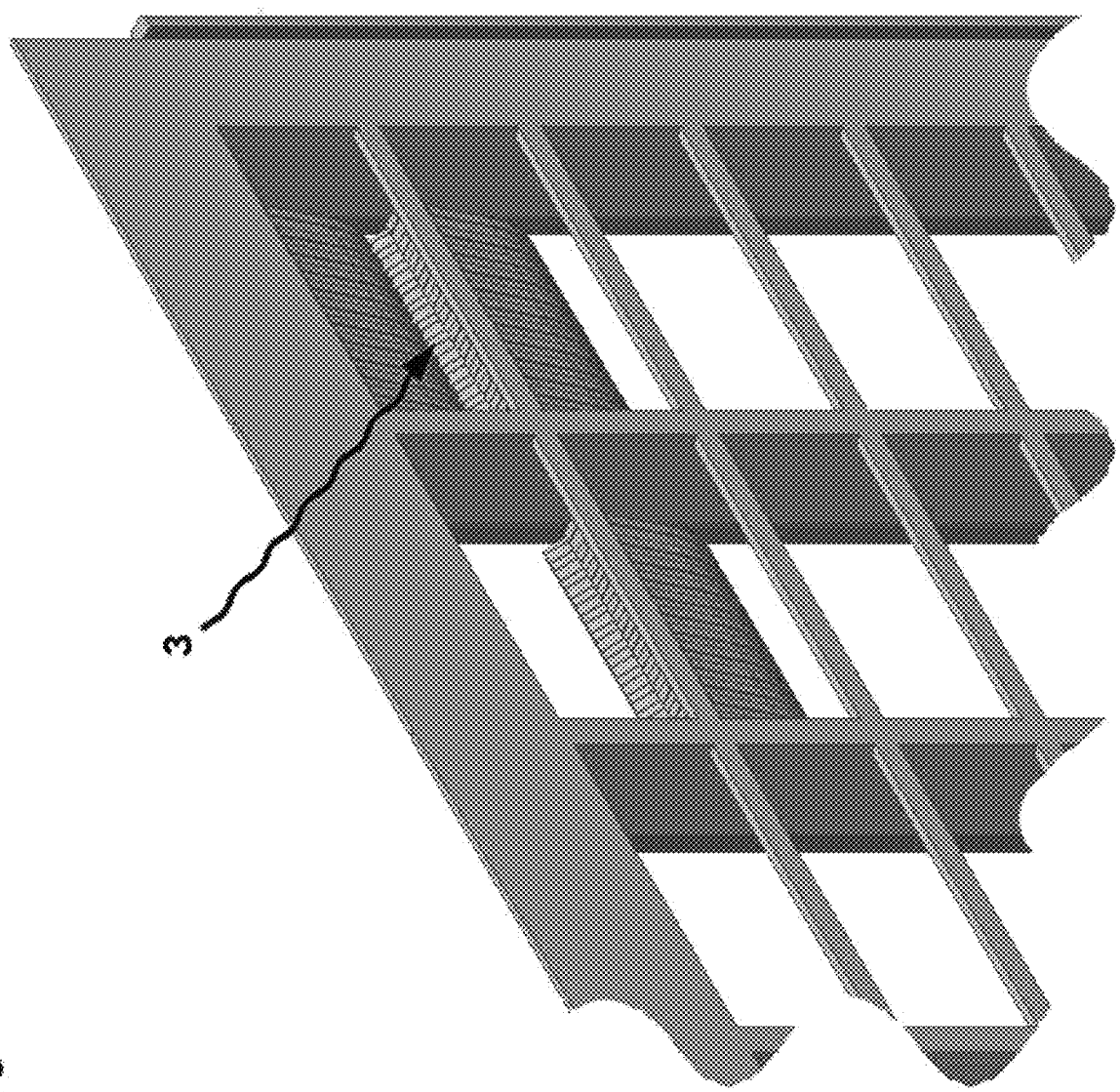
FIG. 5 shows the partial assembly of the silicone device(s) and the semi-rigid structure from the front. Shown is three silicone devices inserted into the structure cells to form the delineation zone.
Figure 6:
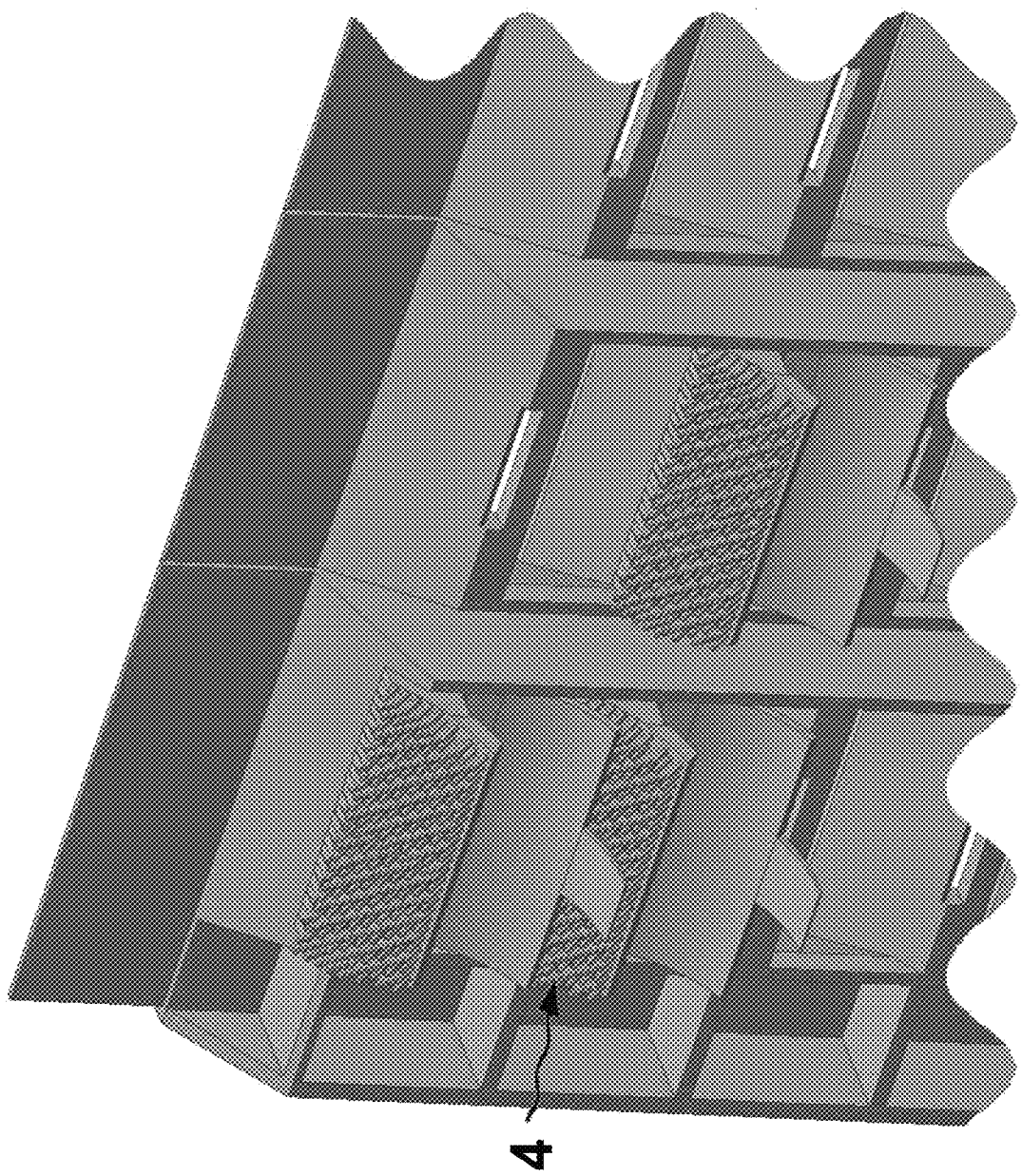
FIG. 6 shows the partial assembly of the silicone device(s) and the semi-rigid structure from the back. Shown is three silicone devices inserted into the structure cells to form the delineation zone.
Figure 7:
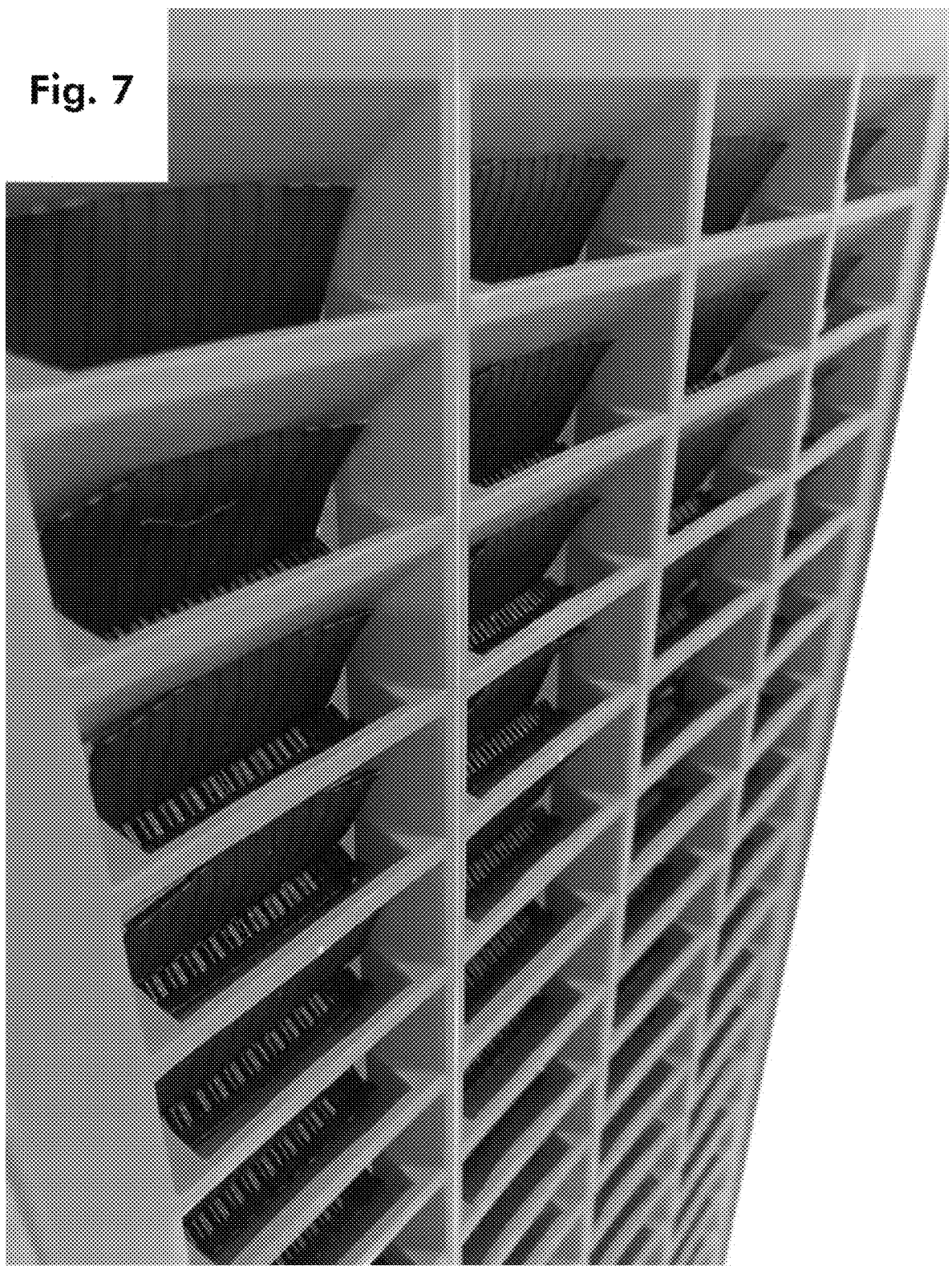
FIG. 7 shows a picture of the front (air side) of a complete assembly of the silicone device of FIGS. 1-2 and the semi-rigid structure of FIG. 3-4.
Figure 8:
FIG. 8 shows a picture of the back (watered side) of a complete assembly of the silicone device of FIG. 1-2 and the semi-rigid structure of FIG. 3-4.

In one embodiment of the invention, the device, FIG. 1-17, is comprised of non-woven synthetic polymeric materials such as silicone rubber, polypropylene and/or a combination of the two. The delineation between the shoot system (or shoot zone) and root system (or root zone) is also a delineation between the area of the device that receives nutrient rich water and the area that is exposed to light and air for the stem and foliage to develop. The portion of the device forming the delineation between the shoot system and root system may be comprised, for example, of flexible silicone rubber protrusions 1, flaps 2 or a combination thereof as seen in FIG. 1 (A-F). The protrusions may also be oriented in opposition to each other as demonstrated, for example, with the orientation of the protrusions 1 of FIG. 17 (A-B). This flexible device allows water supplied to the shoot zone as a mist, spray, drip or film, to wick into the delineation zone 3 to ensure, for example, that newly planted seeds are kept moist during germination. The device additionally allows water supplied from the shoot zone side of the device to drain toward the root zone. Seeds are placed on the device on the shoot zone side of the device, resting on the protrusions forming the delineation. When the device is used for growing plant clones, root stock, seedlings or plants, these are inserted through the delineation zone such that the root of the plant is on the root zone side of the device and the stem or foliage of the plant is on the shoot zone side of the device. The protrusions are spaced appropriately and comprised of sufficiently rigid material to prevent the seeds, germinated seeds, plant clones, root stock, seedlings or plants from passing through the delineation zone under their own weight. Similarly, the protrusions must be comprised of sufficiently flexible material to allow the plants to grow through the delineation zone and to allow insertion of plant clones, root stock, seedlings or plants without damage to the device or plants. Upon seed germination, the newly germinated root will continue to grow into the root zone (watered side) where nutrient rich water is provided and the shoot system will continue to grow into the shoot zone (air side) where exposure to light and circulated air is provided.

According to an embodiment of the invention, plant clones such as basil cuttings may be grown using the device. The stem of the plant clone can be inserted into the device through the delineation zone such that the cut stem where the root zone is intended to develop is on the watered side of the device and the shoot system is on the shoot zone side. The embodiment shown in FIG. 1-16 shows how the device can function in a vertical growing plane.

According to an embodiment of the invention, root stock such as from strawberries may be grown using the device. The root portion of the root stock can be inserted into the device through the delineation zone such that the root system is on the watered side of the device and the shoot system is on the shoot zone side.

According to an embodiment of the invention, the device may be provided water from the shoot zone side, such that the water drains into the device through the delineation zone to reach the root zone. Water may be provided from the shoot zone side of the device during initial planting, such as during the germination process for newly planted seeds, or continuously.

According to an embodiment of the invention, the device is oriented relative to the ground such that water provided from the shoot zone side will drain into the device passing through the delineation zone into the watered side.

According to an embodiment of the invention, the device is oriented relative to the ground such that water provided from the watered side does not substantially pass through the delineation zone and remains or drains from the watered side of the device.

According to an embodiment of the invention, the device can be incorporated into a horizontal apparatus to enable hydroponic growing via DWC, NFT, flood-drain or aeroponics. Such an embodiment is shown in FIG. 17A-B.

According to an embodiment of the invention, the device can be incorporated into vertical apparatus to enable hydroponic growing via NFT, drip watering, or aeroponics. Such an embodiment is show in FIG. 1-16.

According to an embodiment of the invention, the device can be incorporated into angled apparatus to enable hydroponic growing via NFT, drip watering, or aeroponics.

According to an embodiment of the invention, the device can be used with hydroponic systems using synthetic, natural, combination or aquaponic nutrient enriched water.

According to an embodiment of the invention, multiple devices can be inserted into a semi-rigid structure to form one or multiple planes on which to grow crops. The planes may be oriented vertically, horizontally, slanted, in towers, multifaceted or circular columns. If oriented horizontally, these assemblies may be stacked to for two or more surfaces on which to grow crops.

According to an embodiment of the invention, the semi-rigid structures with multiple devices inserted can form multifaceted columns as seen in FIG. 9-14. Such columns are provided water to the interiors of the column from the top of the column. The water drains and is recycled for use from the bottom of the column.

According to an embodiment of the invention, the semi-rigid structures with multiple devices inserted can form horizontal planes wherein water is provided to the underside of the sheet where the root zone develops, and drains and is recycled from beneath the sheet.

According to an embodiment of the invention, the semi-rigid structures may be planted with seeds of varying size, plant clones or root stock.

According to an embodiment of the invention, the semi-rigid structures may be planted with seeds wherein seeds are planted directly on the delineation zone 3 formed by the flexible devices assembled into the semi-rigid structures.

According to an embodiment of the invention, the semi-rigid structures may be planted with plant clones such as basil stems wherein the stem of the plant is inserted through the delineation zone.

According to an embodiment of the invention, the semi-rigid structures may be planted with root stock wherein the root stock is inserted through the delineation zone.

According to an embodiment of the invention, when the crops are ready to harvest a cutting tool may be applied across the foliar portion growing through the front of the semi-rigid structure to cut the grown crops from the remaining portion of the plant body.

According to an embodiment of the invention, after the harvest of the edible portion of the crop the semi-rigid structure may be washed with high-pressure washing device to remove all plant material.

Figure 15:
FIG. 15 shows multiple apparatus of FIG. 9 with lighting and HVAC columns interspersed to provide light and circulated air to each column of each mobile apparatus of FIG. 9.
Figure 16:
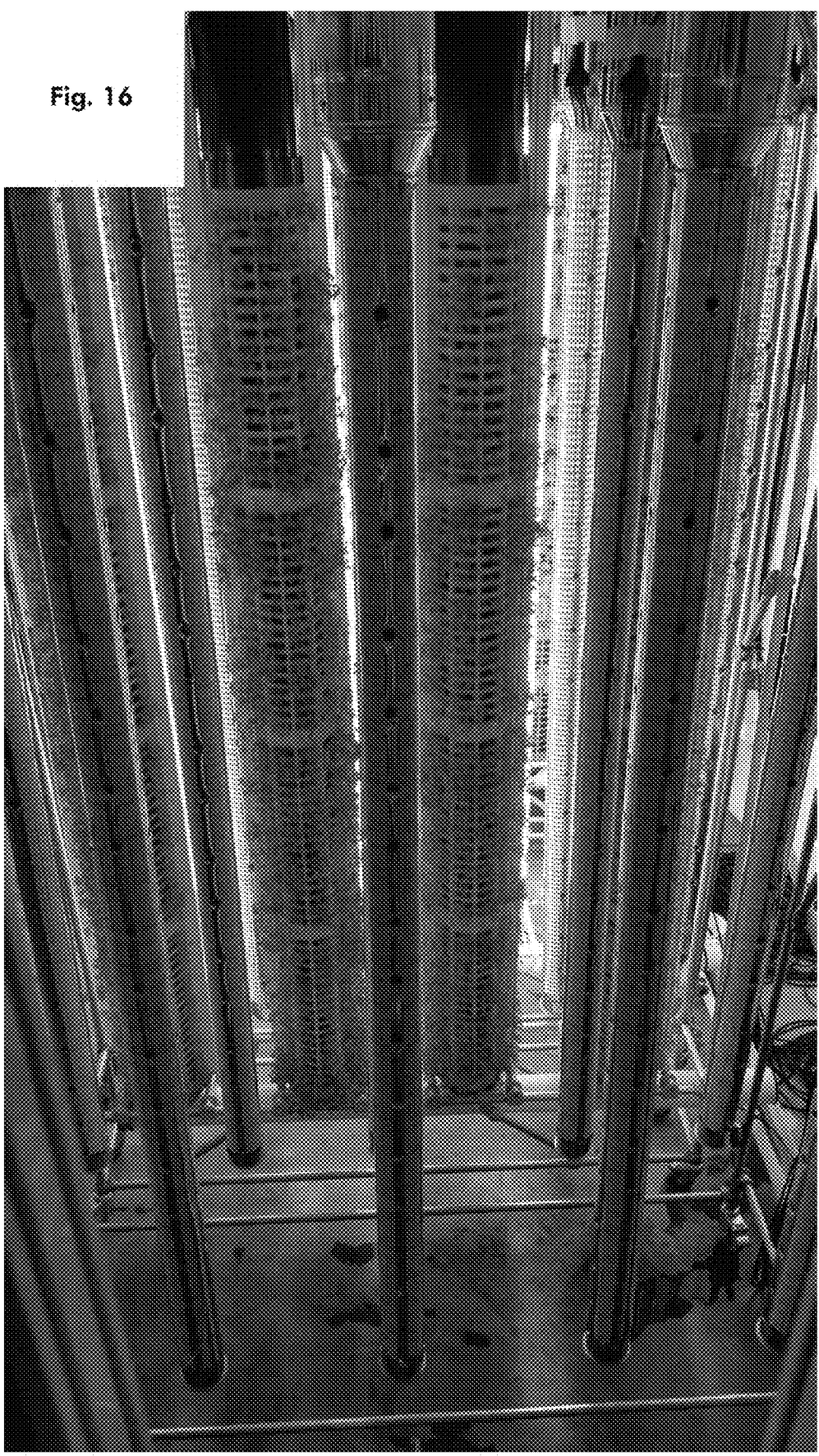
FIG. 16 shows a different angle of the multiple apparatus picture in FIG. 15, highlighting the combination lighting and HVAC tubs used to light and provide fresh air to the growing apparatus.

According to an embodiment of the invention, an array of tubes is provided on which LED lights are affixed, FIG. 15-16, and through which fresh air is circulated through repeating orifices along the surface of the tubes. The tubes may be circular, square, rectangular or other polygonal cross section. The tubes may be organized in a vertical, horizontal or slanted array as is optimal to light and provide air to the outer surface of the assembled apparatus.

Figure 9:
FIG. 9 shows a complete apparatus on a mobile frame, the assembly consists of 32 of the semi-rigid structures of FIG. 3-4. The structures are assembled into columns, water is provided from the top in the form of a spray and drains from the bottom through the pipe located under the columns.
Figure 10:
FIG. 10 shows a top down view a partial assembly of the semi-rigid structure assembled with the silicone device with partially grown out foliage. The foliage grows toward the outside of the formed column and the roots grow inward where water is provided to the assembly.
Figure 11:
FIG. 11 shows a front view of the partial assembly of FIG. 10, highlighting the foliar growth away from the delineation zone.
Figure 12:
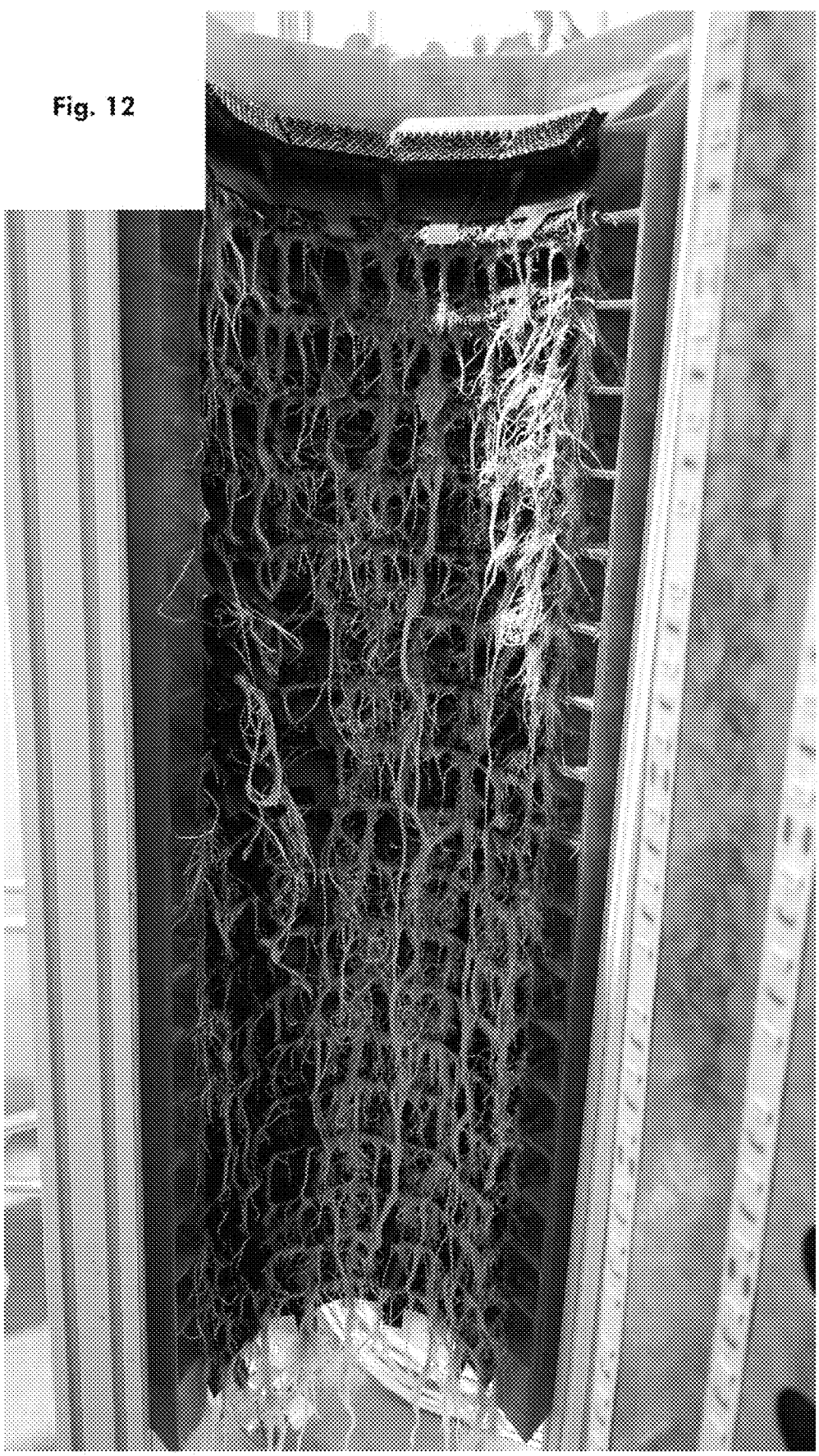
FIG. 12 shows a back view of the partial assembly of FIG. 10, highlighting the root growth away from the delineation zone.
Figure 13:
FIG. 13 shows newly germinated seedlings emerging outward from the delineation zone.
Figure 14:
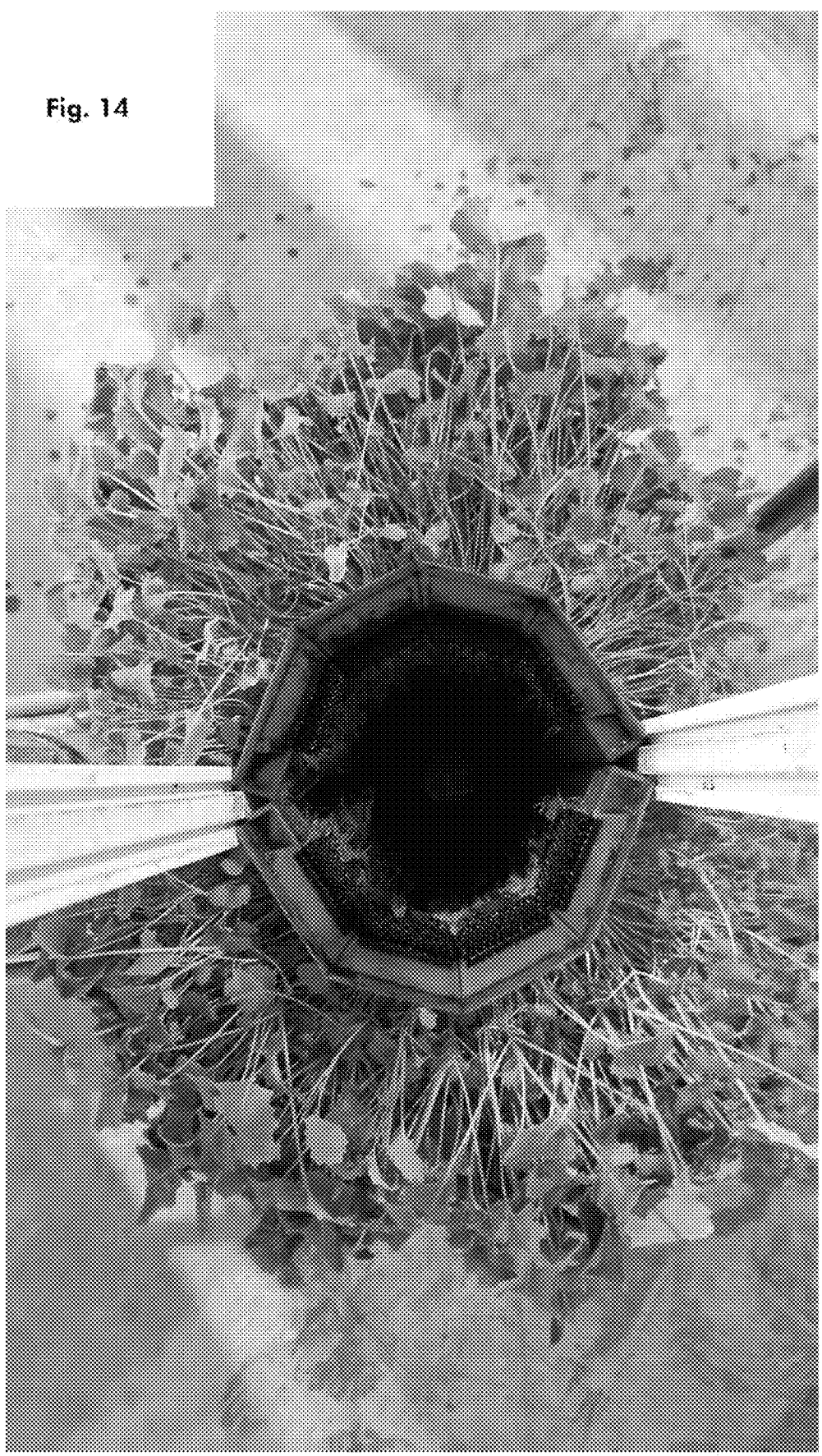
FIG. 14 shows a top down view of a partial assembly of the apparatus with the root zone in the center of the column and the shoot zone with foliar growth radially outward from the center of the column.

According to an embodiment of the invention, the fully assembled apparatus of FIG. 9 is inserted into an array of structures pictured in FIG. 15-16 that provide light and circulated air to each column of each assembly picture in FIG. 9.

What is claimed is:

1. A device for growing plants, comprising:
    A first plurality of flexible protrusions comprising a synthetic, non-biodegradable polymer,
    wherein the flexible protrusions are attached to a structure that defines a delineation between a root zone and a shoot zone,
    wherein the flexible protrusions are sufficient to suspend one or more seeds in air, such that, when the device is in use, the seeds cannot pass through the delineation under their own weight;
    wherein the device, and the first plurality of flexible protrusions therein, are sufficient to suspend the one or more seeds in air, during germination, such that, when the device is in use, the germinating seeds cannot pass through the delineation under their own weight,
    wherein the device, and the first plurality of flexible protrusions therein, are sufficient to support one or more plants germinated from the seeds, plant clones, plant cuttings, root stock, or plants placed into the device,
    wherein the first plurality of flexible protrusions are (a) attached to the structure in a resting position, and (b) adopt a flexed position in response to an external force, and (c) the flexible protrusions return to the resting position upon removal of the external force,
    wherein a second plurality of flexible protrusions comprising a synthetic, non-biodegradable polymer is attached to the structure of the device,
    and wherein, the resting position of the first plurality of flexible protrusions is further described by the one or more of the protrusions in the first plurality of protrusions making contact with one or more protrusions in the second plurality of protrusions.

2. The device according to claim 1, wherein when one or more protrusions of the first plurality of protrusions adopt the flexed position in response to an external force, said protrusions separate from making contact with one or more protrusions of the second plurality of protrusions until the external force is removed.

3. The device according to claim 1, wherein the delineation provided by the structure to which the device is attached, when in use, has an orientation relative to the ground selected from the group consisting of a horizontal plane, a vertical plane, and a slanted plane.

4. The device according to claim 1, wherein the protrusions have a Shore A hardness of less than 100.

5. The device according to claim 1, wherein the device is removable from the structure.

6. The device according to claim 1, wherein the device is permanently attached to the structure.

7. The device according to claim 1, wherein the structure to which the device is attached is removable from a superstructure.

8. The device according to claim 7, wherein the superstructure is mobile.

9. A method of growing plants, comprising:
    growing one or more plants from seed, the device comprising:
    A first plurality of flexible protrusions comprising a synthetic, non-biodegradable polymer,
    wherein the flexible protrusions are attached to a structure that defines a delineation between a root zone and a shoot zone,
    wherein the flexible protrusions are sufficient to suspend one or more seeds in air, such that, when the device is in use, the plants cannot pass through the delineation under their own weight
    wherein the device, and the first plurality of flexible protrusions therein, are sufficient to suspend the one or more seeds in air, during germination, such that, when the device is in use, the germinating seeds cannot pass through the delineation under their own weight,
    wherein the device, and the first plurality of flexible protrusions therein, are sufficient to support one or more plants germinated from the seeds, plant clones, plant cuttings, root stock, or plants placed into the device,
    wherein the first plurality of flexible protrusions are (a) attached to the structure in a resting position, and (b) adopt a flexed position in response to an external force, and (c) the flexible protrusions return to the resting position upon removal of the external force,
    wherein a second plurality of flexible protrusions comprising a synthetic, non-biodegradable polymer is attached to the structure of the device,
    and wherein, the resting position of the first plurality of flexible protrusions is further described by the one or more of the protrusions in the first plurality of protrusions making contact with one or more protrusions in the second plurality of protrusions.

10. The method of claim 9, wherein an edible portion of the plants is harvested from the device by shearing, picking, or severing.

11. The method of claim 10, wherein the harvesting includes leaving a portion of the one or more plants in the device, and subsequently removing said portion from the device, and reusing the device.

12. The method of claim 9, wherein the growing comprises germinating and growing the plants without a fibrous media.

13. The method of claim 10, wherein, when one or more of the flexible protrusions adopt the flexed position in response to an external force, the seeds, plants, or portions of plants remaining in the device following a harvest, pass through the delineation and are removable from the device.

14. The method of claim 10, wherein the external force is a high-pressure washing device.

* * * * *